July 9, 1940.  J. T. UDEN  2,207,236
PHOTOGRAPHIC CAMERA
Filed July 29, 1939
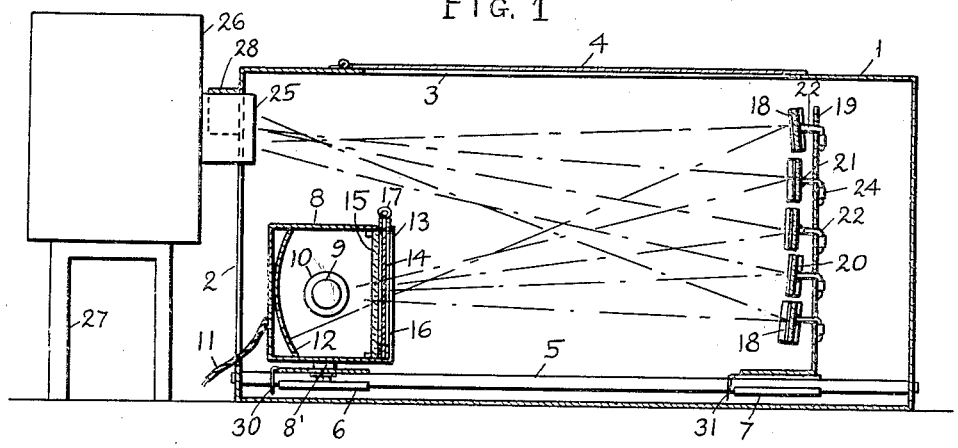
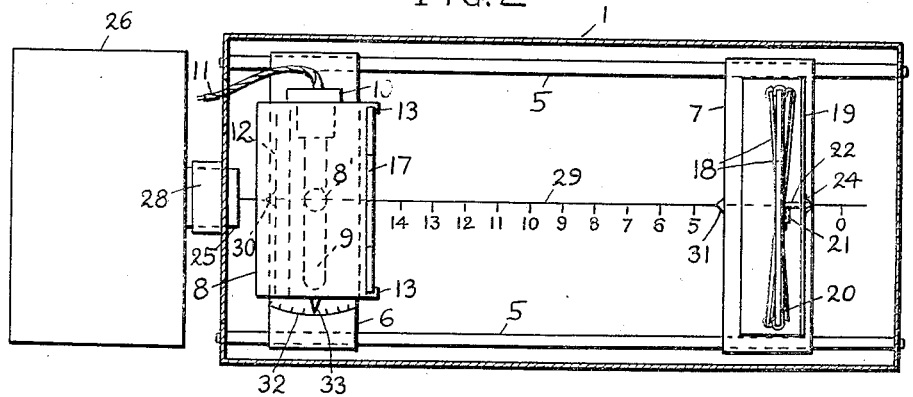
JACOB T. UDEN
INVENTOR.
BY John P. Nirevnow
ATTORNEY.

UNITED STATES PATENT OFFICE 2,207,236

PHOTOGRAPHIC CAMERA

Jacob T. Uden, New York, N. Y.

Application July 29, 1939, Serial No. 287,227

6 Claims. (Cl. 88—24)

My invention relates to photographic cameras and has particular reference to cameras for reproducing images from negatives or positives.

My invention has for its object to provide a camera which can be used for making prints with multiple images from a single image. Thus a print can be obtained, for instance, with several images differently positioned, although the original had a single image.

Another object of my invention is to provide a camera for printing more or less distorted images with changed proportions of the height and width of the objects.

I accomplish this purpose by providing a camera with a plurality of mirrors which can be adjusted as to their vertical and horizontal inclination in such a manner that a number of images can be projected on a light-sensitive plate or paper from a single image.

My camera is particularly adapted for taking pictures for amusement purposes.

My invention is more fully described in the accompanying specification and drawing in which—

Fig. 1 is a sectional elevational view of my camera, and

Fig. 2 is a sectional top plan view of the same.

My camera consists of an elongated housing 1 with an opening 2 at the rear and an opening 3 at the top which can be closed by a hinged cover 4. Rails 5 are provided at the bottom of the housing for sliding carriages 6 and 7. The carriage 6 supports a projector 8 on a pivot 8' so that the projector can be turned in different directions. An electric lamp 9 is supported in the projector in a socket 10.

A cord 11 extends from the socket to a source of electric current (not shown). A cylindrical reflector 12 is placed in the projector back of the lamp. The front side of the projector is covered by a glass plate 15 for protecting a negative 14 from the heat of the lamp. The negative is held in a suitable cassette 16 formed of two parts joined by a hinge 17 on top. The cassette with the negative slides in hooked edges 13 of the projector casing. The light from the lamp passes through the negative 14 and is directed on mirrors 18 adjustably supported on a bracket 19 mounted on the carriage 7. The mirrors are held on metal back plates 20 with horizontal clips 21 for the ends of hooks 22 on which the mirrors can be turned in vertical planes for angular adjustment. The hooks extend through the bracket 19 and their rear ends are bent at right angles in a horizontal direction, fitted with friction in clips 24 in which they can be turned for angular adjustment of the mirrors in horizontal planes.

The light from the mirrors is directed into an objective lens mount 25 of an ordinary photographic camera 26 supported on a stand or table 27. The mount 25 is held against a curved guide plate 28 on the housing 1 at the top.

A scale 29 is drawn on the bottom plate of the housing 1 calibrated in convenient units such as inches and their fractions, and the carriages 6 and 7 have index points 30 and 31 for indicating their positions on the rails. An arcuate scale 32 is also provided on the carriage 6 for an index point 33 on the projector 8 and is used for indicating the angular position of the projector. An ordinary tripod can be used for the camera 26 if it is desired to change or adjust its inclination toward the mirrors 18.

By properly adjusting the individual mirrors 18 and focusing the camera 26 it is possible to obtain several images on a film in the camera in different places on the film. By turning the projector 8 and correspondingly adjusting the mirrors it is also possible to obtain images distorted as to the proportion of the height to the width thereby producing an amusing effect. The rear opening 2 can be covered if desired. It can be used for handling the cassettes with the negatives, although they can be reached through the top opening 3.

It is understood that my camera can be modified without departing from the spirit of my invention as set forth in the appended claims.

I claim as my invention:

1. A photographic camera comprising a housing, rails extending longitudinally of the housing, a projector slidably supported on the rails at one end of the housing, a bracket movably supported on the rails at the other end of the housing, a plurality of mirrors adjustably supported on the bracket, means to removably support a negative in the projector, means to illuminate the negative and to direct a beam of light through the negative onto the mirrors, the mirrors being adapted to be adjusted for separating the beam into a plurality of beams, means to support a camera with a light-sensitive film in the path of the reflected beams for taking a multiple-image picture from the negative, a scale extending longitudinally of the housing, and index points on the projector and on the bracket for indicating their position on the scale.

2. A photographic camera comprising a housing, a carriage movably supported in the housing at one end, a projector rotatively supported on the carriage, a scale on the carriage for indicating the angular position of the projector, means to removably support a negative plate in the projector, a lamp in the projector for throwing a beam of light through the negative plate, a plurality of mirrors adjustably supported at the other end of the housing adapted to receive the beam of light and to separate it into several beams, means to support a camera with a light-sensitive film in the path of the reflected beams for taking a picture on the film with several separate images of the negative, and a removable cover for the housing.

3. A photographic camera comprising a housing, a projector supported in the housing at one end, means to removably support a negative in the projector, a lamp in the projector, a reflector for directing a beam of light from the lamp through the negative, a vertical bracket supported in the housing at the other end, a plurality of hooks rotatively supported on the bracket, mirrors rotatively supported on the hooks for adjustment in horizontal and vertical planes, and means to support a camera with a light-sensitive film at the housing, the mirrors being adapted to reflect the beam of light from the projector into the camera, separating it into several beams for obtaining a multiple-image picture on the film.

4. A photographic camera comprising a housing, a projector in the housing at one end, means to support a negative in the projector, a lamp in the projector adapted to throw a beam of light through the negative, a vertical bracket at the other end of the housing, a plurality of hooks supported on the bracket in vertical spaced relation to each other for rotation in horizontal planes, narrow elongated mirrors mounted on the free ends of the hooks for rotation in vertical planes, the mirrors being adapted to receive the beam of light from the projector and to split it into several beams, and means to support a camera with a light-sensitive film in the path of the reflected beams for taking a picture with several images of the negative.

5. A photographic camera comprising a housing, rails extending longitudinally of the housing, a projector slidably supported on the rails at one end of the housing, a bracket movably supported on the rails at the other end of the housing, a plurality of mirrors adjustably supported on the bracket, means to removably support a negative in the projector, means to illuminate the negative and to direct a beam of light through the negative onto the mirrors, the mirrors being adapted to be adjusted for separating the beam into a plurality of beams, means to support a camera with a light-sensitive film in the path of the reflected beams for taking a multiple-image picture from the negative.

6. A photographic camera comprising a housing, a carriage movably supported in the housing at one end, a projector rotatively supported on the carriage, means to removably support a negative plate in the projector, a lamp in the projector for throwing a beam of light through the negative plate, a plurality of mirrors adjustably supported at the other end of the housing adapted to receive the beam of light and to separate it into several beams, means to support a camera with a light-sensitive film in the path of the reflected beams for taking a picture on the film with several separate images of the negative, and a removable cover for the housing.

JACOB T. UDEN.